US012757146B2

(12) United States Patent
Kang et al.

(10) Patent No.: US 12,757,146 B2
(45) Date of Patent: Oct. 6, 2026

(54) REGISTRATION PROCEDURE OF SIDELINK TERMINAL IN WIRELESS COMMUNICATION SYSTEM

(71) Applicant: Samsung Electronics Co., Ltd., Gyeonggi-do (KR)

(72) Inventors: Hyunjeong Kang, Gyeonggi-do (KR); Anil Agiwal, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 184 days.

(21) Appl. No.: 18/723,720

(22) PCT Filed: Dec. 8, 2022

(86) PCT No.: PCT/KR2022/019902
§ 371 (c)(1),
(2) Date: Jun. 24, 2024

(87) PCT Pub. No.: WO2023/121072
PCT Pub. Date: Jun. 29, 2023

(65) Prior Publication Data
US 2025/0063527 A1 Feb. 20, 2025

(30) Foreign Application Priority Data
Dec. 22, 2021 (KR) ........................ 10-2021-0184991

(51) Int. Cl.
*H04W 60/04* (2009.01)
*H04W 76/27* (2018.01)

(52) U.S. Cl.
CPC ........... *H04W 60/04* (2013.01); *H04W 76/27* (2018.02)

(58) Field of Classification Search
CPC .............................. H04W 60/04; H04W 76/27
(Continued)

(56) References Cited

U.S. PATENT DOCUMENTS 8,880,003 B2 11/2014 Lee
10,555,168 B2 2/2020 Mildh et al.
(Continued)

FOREIGN PATENT DOCUMENTS

KR 10-2012-0059751 6/2012
KR 10-2020-0003224 11/2013
(Continued)

OTHER PUBLICATIONS

PCT/ISA/210 Search Report dated Mar. 17, 2023, issued on PCT/KR2022/019902, pp. 6.
(Continued)

*Primary Examiner* — Christopher R Crompton
(74) *Attorney, Agent, or Firm* — The Farrell Law Firm, P.C.

(57) ABSTRACT

The present disclosure relates to: a communication technique for merging IoT technology with a 5G communication system for supporting a data transmission rate higher than that of a 4G system; and a system therefor. The present disclosure can be applied to intelligent services (for example, smart homes, smart buildings, smart cities, smart-cars or connected cars, healthcare, digital education, small businesses, security- and safety-related services, and the like) on the basis of 5G communication technology and IoT-related technology. The present disclosure relates to a method and a device for performing, on the basis of a sidelink in a wireless communication system, a RAN notification area (RNA) update operation of a remote terminal, in an RRC_INACTIVE state, connected to a relay.

12 Claims, 9 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 11,356,879 B2 * | 6/2022 | Kim | ...................... | H04W 24/10 |
| 2020/0092779 A1 * | 3/2020 | Jung | ..................... | H04W 48/18 |
| 2023/0354461 A1 * | 11/2023 | Zhang | ................... | H04W 76/27 |

FOREIGN PATENT DOCUMENTS

| | | | | |
|---|---|---|---|---|
| KR | 10-2021-0141368 | 11/2021 | | |
| KR | 20220070881 A * | 5/2022 | ............ | H04W 92/18 |
| WO | WO 2021/207505 | 10/2021 | | |

OTHER PUBLICATIONS

PCT/ISA/237 Written Opinion dated Mar. 17, 2023, issued on PCT/KR2022/019902, pp. 5.
3GPP TS 38.300 V16.7.0 (Sep. 2021), pp. 147.
3GPP TS 38.304 V16.6.0 (Sep. 2021), pp. 39.
3GPP TS 38.331 V18.1.0 (Mar. 2024), pp. 1649.
3GPP TS 38.304 V18.1.0 (Mar. 2024), pp. 56.

* cited by examiner

REGISTRATION PROCEDURE OF SIDELINK TERMINAL IN WIRELESS COMMUNICATION SYSTEM

PRIORITY

This application is a National Phase Entry of PCT International Application No. PCT/KR2022/019902, which was filed on Dec. 8, 2022, and claims priority to Korean Patent Application No. 10-2021-0184991, which was filed on Dec. 22, 2021, the entire content of each of which is incorporated herein by reference.

TECHNICAL FIELD

The disclosure relates to a wireless communication system. More specifically, the present disclosure relates to a method and a device for performing, based on a sidelink in a wireless communication system, a RAN notification area (RNA) update operation, that is, a terminal location registration update operation of a remote terminal in an RRC_INACTIVE state, connected to a relay.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network communication system" or a "post long term evolution (post LTE) system".

The 5G communication system is considered to be implemented in ultrahigh frequency (mmWave) bands, (e.g., 60 GHz bands) so as to accomplish higher data rates. To decrease the propagation loss and increase the transmission distance of radio waves in the mmWave bands, beamforming, massive multiple-input multiple-output (MIMO), full dimensional MIMO (FD-MIMO), array antenna, an analog beam forming, and large scale antenna techniques have been discussed in the 5G communication system.

In addition, in the 5G communication system, technical development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The 5G system is considering supports for more various services as compared to the conventional 4G system. For example, the most representative service may include a ultrawide band mobile communication service (enhanced mobile broad band (eMBB)), an ultrahigh reliable/low latency communication service (ultra-reliable and low latency communication (URLLC)), a massive device-to-device communication service (massive machine type communication (mMTC)), and a next-generation broadcast service (evolved multimedia broadcast/multicast service (eMBMS)). A system providing the URLLC service may be referred to as a URLLC system, and a system providing the eMBB service may be referred to as an eMBB system. The terms "service" and "system" may be interchangeably used.

Among these services, the URLLC service is a service that is newly considered in the 5G system, in contrast to the existing 4G system, and requires to meet ultrahigh reliability (e.g., packet error rate of about 10-5) and low latency (e.g., about 0.5 msec) conditions as compared to the other services. To meet these strict conditions required therefor, the URLLC service may need to apply a shorter transmission time interval (TTI) than the eMBB service, and various operating schemes employing the same are now under consideration.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have recently been researched.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication are implemented by beamforming, MIMO, and array antenna techniques that are 5G communication technologies. Application of a cloud radio access network (cloud RAN) as the above-described big data processing technology may also be considered an example of convergence of the 5G technology with the IoT technology.

Also, device-to-device direct communication (sidelink communication) using the 5G communication system has been studied, and it is expected that the sidelink communication may be applied to vehicle communication (vehicle-to everything, hereinafter "V2X") to provide various services to users.

In particular, there is a need for schemes using sidelink relays capable of supporting service coverage extensions, data transfer reliability increases, and terminal power consumption reductions.

DISCLOSURE OF INVENTION

Technical Problem

The disclosure may provide a method in which a terminal in an RRC_INACTIVE state performs a RAN notification area (RNA) update procedure in a relay system in which the terminal may transmit or receive data to or from a network through a sidelink relay in a wireless communication system, and a device therefor.

The technical subjects pursued in the disclosure may not be limited to the above-mentioned technical subjects, and other technical subjects which are not mentioned may be clearly understood, through the following descriptions, by those skilled in the art to which the disclosure pertains.

Solution to Problem

To address the aforementioned issue, an embodiment of the disclosure may provide a method of a first terminal in a wireless communication system, the method including an operation of, in case that a radio resource control (RRC) release message with respect to a second terminal is received from a base station, transmitting the RRC release message to the second terminal through a PC5 interface, an operation of, in case that a preconfigured condition is satisfied, determining state transition from an RRC inactive state to an RRC idle state, and an operation of transmitting, to the second terminal, a notification message including a PC5 indicator associated with the state transition. In addition, an embodiment of the disclosure may provide a method of a second terminal in a wireless communication system, the method including an operation of receiving a radio resource control (RRC) release message with respect to the second terminal, which has been transmitted by a base station, from a first terminal through a PC5 interface with the first terminal, an operation of performing transition to an RRC inactive state or an RRC idle state based on the RRC release message, and an operation of receiving, from the first terminal, a notification message including a PC5 indicator associated with state transition of the first terminal to the RRC idle state.

In addition, an embodiment of the disclosure may provide a first terminal in a wireless communication system, the first terminal including a transceiver, and a controller configured to control, in case that a radio resource control (RRC) release message with respect to a second terminal is received from a base station, the transceiver to transmit the RRC release message to the second terminal through a PC5 interface, determine, in case that a preconfigured condition is satisfied, state transition from an RRC inactive state to an RRC idle state, and control the transceiver to transmit, to the second terminal, a notification message including a PC5 indicator associated with the state transition.

In addition, an embodiment of the disclosure may provide a second terminal in a wireless communication system, the second terminal including a transceiver and a controller configured to control the transceiver to receive a radio resource control (RRC) release message with respect to the second terminal, which has been transmitted by a base station, from a first terminal through a PC5 interface with the first terminal, control transition to an RRC inactive state or an RRC idle state based on the RRC release message, and control the transceiver to receive, from the first terminal, a notification message including a PC5 indicator associated with state transition of the first terminal to the RRC idle state.

An embodiment of the disclosure may provide a method by which a terminal is connected to a sidelink relay in a wireless communication system and performs an RNAU procedure, the method including an operation in which the terminal is configured with, from a base station, timer information to be applied to periodically perform RNAU while being connected to a sidelink relay, an operation in which the terminal periodically performs an RNAU procedure according to an RNAU timer allocated from the base station, an operation in which the terminal determines a connection state with a serving sidelink relay when periodically performing the RNAU procedure, an operation in which the terminal determine whether a sidelink relay is reselected when periodically performing the RNAU procedure, and an operation in which the terminal performs transition to an RRC_IDLE state in case that it is not possible to reselect a sidelink relay determined as suitable when periodically performing the RNAU procedure.

Advantageous Effects of Invention

Various embodiments of the disclosure may provide a method and a device which may effectively provide a service in a wireless communication system and extend a service coverage.

Advantageous effects obtainable from the disclosure may not be limited to the above-mentioned effects, and other effects which are not mentioned may be clearly understood, through the following descriptions, by those skilled in the art to which the disclosure pertains.

MODE FOR THE INVENTION

Figure 1A:
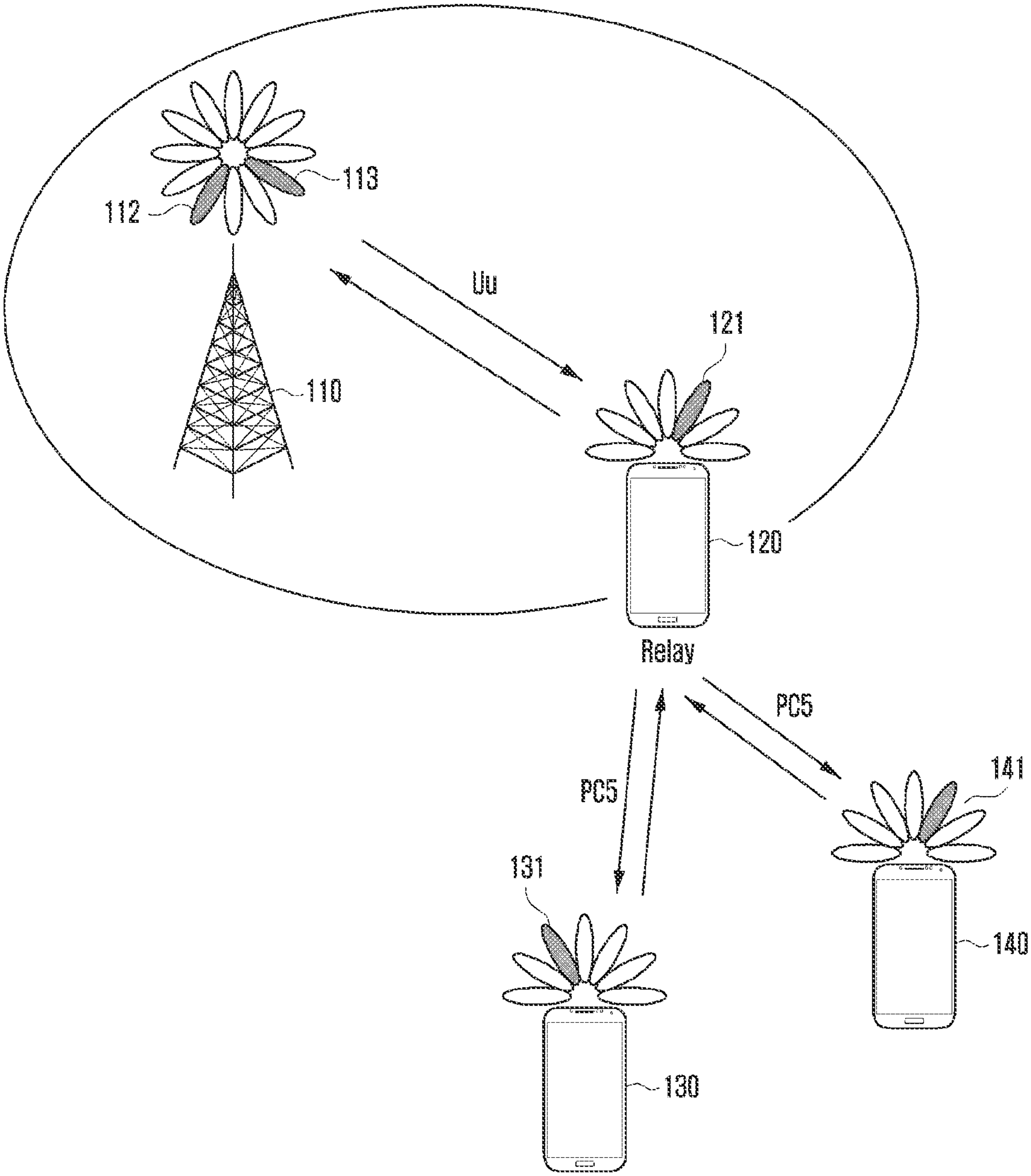
FIG. 1A is a view illustrating a wireless communication system according to an embodiment of the disclosure.

Hereinafter, exemplary embodiments of the disclosure will be described in detail with reference to the accompanying drawings. It should be noted that, in the accompanying drawings, the same or like elements are designated by the same or like reference signs as much as possible. Furthermore, detailed descriptions of known functions or configurations that may make the subject matter of the disclosure unclear will be omitted.

In describing the embodiments in the specification, descriptions related to technical contents well-known in the relevant art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Furthermore, the size of each element does not completely reflect the actual size. In the respective drawings, the same or corresponding elements are provided with the same or corresponding reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference signs indicate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

The following detailed description of embodiments of the disclosure is mainly directed to New RAN (NR) as a radio access network and Packet Core (5G system or 5G core network or next generation core (NG Core)) as a core network in the 5G mobile communication standards specified by the 3rd generation partnership project (3GPP) that is a mobile communication standardization group, but based on determinations by those skilled in the art, the main idea of the disclosure may be applied to other communication systems having similar backgrounds through some modifications without significantly departing from the scope of the disclosure.

In the 5G system, a network data collection and analysis function (NWDAF), which is a network function for analyzing and providing data collected in a 5G network, may be defined to support network automation. The NWDAF may collect/store/analyze information from the 5G network and provide the results to unspecified network functions (NFs), and the analysis results may be used independently in each NF.

In the following description, some of terms and names defined in the 3GPP standards (standards for 5G. NR, LTE, or similar systems) may be used for the sake of descriptive convenience. However, the disclosure is not limited by these terms and names, and may be applied in the same way to systems that conform other standards.

Hereinafter, the disclosure will describe a method and a device by which a terminal capable of data transmission and reception with a network through connection with a sidelink relay in a sidelink-based relay system may perform an RNAU procedure corresponding to a terminal location registration procedure in an RRC_INACTIVE state in a wireless communication system. The disclosure provides a method and a device by which a terminal in an RRC_INACTIVE state connected to a sidelink relay periodically performs a RNAU procedure in a wireless communication system supporting a sidelink-based relay.

Specifically, the disclosure provides a method by which a terminal in an RRC_INACTIVE is configured with, from a base station, a RNAU timer to be used to periodically perform an RNAU procedure while being connected to a sidelink relay and periodically performs the RNAU procedure in case that the RNAU timer expires and a serving cell of the same RNA is determined to be connected to a serving sidelink relay. The disclosure provides a method for determining whether a terminal in an RRC_INACTIVE is required to reselect a sidelink relay and performing transition to an RRC_IDLE state in case that a suitable sidelink relay may not be selected when performing an operation of reselecting a sidelink relay. According to an embodiment of the disclosure, a terminal may expand service coverage through a sidelink relay or direct communication with another terminal, increase reliability of data transmission and reception, and minimize battery usage of the terminal.

In the following description, terms referring to signals, terms referring to channels, terms referring to control information, terms referring to network entities, terms referring to device elements, and the like are illustratively used for the sake of descriptive convenience. Therefore, the disclosure is not limited by the terms as used herein, and other terms referring to subjects having equivalent technical meanings may be used.

In the following description, a base station is an entity that allocates resources to terminals, and may be at least one of a gNode B (gNB), an eNode B (eNB), a Node B, a base station (BS), a wireless access unit, a base station controller, and a node on a network. A terminal may include a user equipment (UE), a mobile station (MS), a cellular phone, a smartphone, a computer, or a multimedia system capable of performing a communication function. However, they are merely examples thereof, and the base station and the terminal are not limited to these examples. In the disclosure, the term "eNB" may be interchangeably used with the term "gNB" for the sake of descriptive convenience. That is, a base station described as "eNB" may indicate "gNB". In the disclosure, the term "terminal" may refer to mobile phones, NB-IoT devices, sensors, and various wireless communication devices.

In the following description, the terms "physical channel" and "signal" may be interchangeably used with the term "data" or "control signal". For example, the term "physical downlink shared channel (PDSCH)" refers to a physical channel over which data is transmitted, but the PDSCH may also be used to refer to the "data". That is, in the disclosure, the expression "transmit ting a physical channel" may be construed as having the same meaning as the expression "transmitting data or a signal over a physical channel".

In the following description of the disclosure, higher signaling refers to a signal transfer scheme from a base station to a terminal via a downlink data channel of a physical layer, or from a terminal to a base station via an uplink data channel of a physical layer. The upper signaling may also be understood as radio resource control (RRC) signaling or a media access control (MAC) control element (CE).

Furthermore, as used in the disclosure, the expression "greater than" or "less than" is used to determine whether a specific condition is satisfied or fulfilled, but this is intended only to illustrate an example and does not exclude "greater than or equal to" or "equal to or less than". A condition indicated by the expression "greater than or equal to" may be replaced with a condition indicated by "greater than", a condition indicated by the expression "equal to or less than" may be replaced with a condition indicated by "less than", and a condition indicated by "greater than and equal to or less than" may be replaced with a condition indicated by "greater than and less than".

Furthermore, embodiments of the disclosure will be described using terms used in some communication standards (e.g., the 3rd generation partnership project (3GPP)), but they are for illustrative purposes only. The embodiments of the disclosure may be easily applied to other communication systems through modifications.

FIG. 1A is a view illustrating a wireless communication system according to an embodiment of the disclosure.

FIG. 1A illustrates, as a part of nodes using a wireless channel in a wireless communication system, a base station 110, a terminal 130 or 140, and a sidelink relay 120 capable of relaying data transmission and reception between the base station and the terminal. Here, the sidelink relay corresponds to a UE-to-network (U2N) relay. Although FIG. 1A shows only one base station, other base stations identical to or similar to the base station 110 may be further included.

The base station 110 corresponds to a network infrastructure for providing wireless access to the terminals 130 and 140 and the sidelink relay 120. The base station 110 has a coverage defined as a predetermined geographic area based on a distance in which a signal is transmittable. The base station 110 may be referred to as "an access point (AP)", "an eNodeB (eNB)", "a 5th-Generation (5G) node", "a next generation nodeB (gNB)", "a wireless point", "a transmission/reception point (TRP)", or another term having an equivalent technical meaning, in addition to the "base station".

The sidelink relay 120 is a device used by a user or network infrastructure and may perform communication with the base station 110 through a wireless channel. A link from the base station 110 to the sidelink relay 120 may be referred to as a downlink (DL), and a link from the sidelink relay 120 to the base station 110 may be referred to as an uplink (UL). The base station 110 and the sidelink relay 120 may be connected through a Uu interface. The uplink (UL) refers to a wireless link through which the sidelink relay 120 transmits data or a control signal to the base station 110, and the downlink (DL) refers to a wireless link through which the base station 110 transmits data or a control signal to the sidelink relay 120.

The sidelink relay 120 may perform communication with the terminal 130 and the terminal 140 through a wireless channel. In this case, a link between the sidelink relay 120 and the terminal 130 and a link between the sidelink relay 120 and the terminal 140 may be referred to as sidelinks, and the sidelink may be referred to as a PC5 interface.

Each of the terminals 130 and 140 may correspond to a device used by the user, and performs communication with the base station 110 through a wireless channel or communication with a network through the sidelink relay 120 and a wireless channel. In the disclosure, only a case in which each of the terminal 130 and the terminal 140 performs communication through a wireless channel with the sidelink relay 120 is illustrated. At least one of the terminal 130 and the terminal 140 may be operated without involvement of a user. That is, at least one of the terminal 130 and the terminal 140 corresponds to a device for performing machine type communication (MTC), and may not be carried by the user. Each of the terminal 130 and the terminal 140 may be referred to as "a user equipment (UE)", "a mobile station", "a subscriber station", "a remote terminal", "a wireless terminal", "an electronic device", "a user device", or another term having a technical meaning equivalent thereto, in addition to the terminal.

Figure 1B:
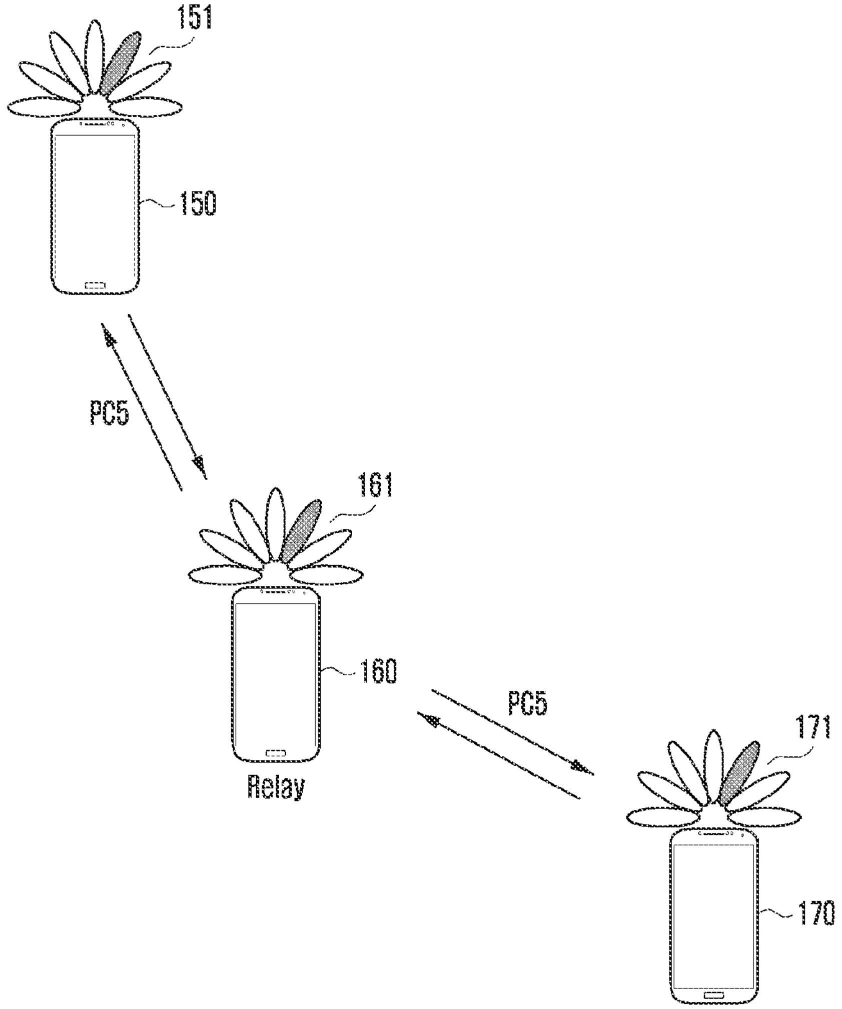
FIG. 1B is a view illustrating a wireless communication system according to an embodiment of the disclosure.

FIG. 1B is a view illustrating a wireless communication system according to an embodiment of the disclosure.

FIG. 1B illustrates, as a part of nodes using a wireless channel in a wireless communication system, a wireless communication system including terminals 150 and 170 and a sidelink relay 160 capable of relaying data transmission and reception. Here, the sidelink relay 160 corresponds to a UE-to-UE (U2U) relay.

The sidelink relay 160 may perform communication with the terminal 150 and the terminal 170 through a wireless channel. In this case, a link between the sidelink relay 160 and the terminal 150 and a link between the sidelink relay 160 and the terminal 170 may be referred to as sidelinks, and the sidelink may be referred to as a PC5 interface.

Each of the terminal 150 and the terminal 170 may correspond to a device used by the user, and may perform direct communication through a wireless channel, or communication with a counterpart terminal through the sidelink relay 160 and a wireless channel. In this case, a link between the terminal 150 and the terminal 170, a link between the terminal 150 and the sidelink relay 160, and a link between the terminal 170 and the sidelink relay 160 may be referred to as sidelinks, and the sidelink may be referred to as a PC5 interface.

At least one of the terminal 150 and the terminal 170 may be operated without involvement of a user. That is, at least one of the terminal 150 and the terminal 170 corresponds to a device for performing machine type communication (MTC), and may not be carried by the user. Each of the terminal 150 and the terminal 170 may be referred to as "a user equipment (UE)", "a mobile station", "a subscriber station". "a remote terminal", "a wireless terminal", "a user device", or another term having a technical meaning equivalent thereto, in addition to the "terminal".

In the following description, uplink or downlink and Uu interface, and sidelink and PC-5 may be used interchangeably.

The base station 110, the sidelink relay 120 or 160, and the terminals 130, 140, 150, and 170 shown in FIGS. 1A and 1B transmit and receive wireless signals in millimeter wave (mmWave) bands (e.g., 28 GHz, 30 GHz, 38 GHz, and 60 GHz). Here, in order to improve the channel gain, the base station 110, the sidelink relay 120 or 160, and the terminals 130, 140, 150, and 170 may perform beamforming. Here, the beamforming may include transmission beamforming and reception beamforming. That is, the base station 110, the sidelink relay 120 or 160, and the terminals 130, 140, 150, and 170 may assign directivity to a transmission signal or a reception signal. To this end, the base station 110, the sidelink relay 120 or 160, and the terminals 130, 140, 150, and 170 may select serving beams 112, 113, 121, 131, 141, 151, 161, and 171 through a beam search or beam management procedure as shown in FIGS. 1A and 1B. After the serving beams 112, 113, 121, 131, 141, 151, 161, and 171 are selected, communication may be performed through a resource having a quasi co-located (QCL) relationship with a resource transmitting the serving beams 112, 113, 121, 131, 141, 151, 161, and 171.

In case that large-scale characteristics of a channel carrying a symbol on a first antenna port may be inferred from a channel carrying a symbol on a second antenna port, the first antenna port and the second antenna port may be evaluated as having a QCL relationship. For example, the large-scale characteristics may include at least one of a delay spread, a Doppler spread, a Doppler shift, an average gain, an average delay, and a spatial receive parameter.

The terminal 130, the terminal 140, the terminal 150, and the terminal 170 shown in FIGS. 1A and 1B may support vehicle communication. In case of vehicle communication, the standardization of a vehicle to everything (V2X) technology has been completed in 3GPP release 14 and release 15 based on a device-to-device (D2D) communication structure in an LTE system, and the standardization of the V2X technology efforts are currently underway to develop a V2X technology has been completed in 3GPP release 16 based on 5G NR. The NR V2X supports broadcast communication, groupcast (or multicast) communication, and unicast communication between terminals. In addition, while LTE V2X aims to transmit and receive basic safety information required for vehicle road driving, the NR V2X aims to provide more advanced services, such as platooning, advanced driving, extended sensor, and remote driving.

The V2X service may divided into a basic safety service and an advanced service. The basic safety service may include detailed services, such as a vehicle notification (cooperative awareness messages (CAM) or basic safety message (BSM)) service, a left turn notification service, a front vehicle collision warning service, an emergency vehicle approach notification service, a front obstacle warning service, and an intersection signal information service, and V2X information may be transmitted or received by using a broadcast, unicast, or group cast transmission method. The advanced service not only demands more enhanced quality of service (QoS) than the basic safety service, but also requires a method for transmitting or receiving V2X information by using unicast and group cast in addition to broadcast so as to transmit and receive V2X information within a specific vehicle group or between two vehicles. The advanced service may include detailed services such as a platooning service, an autonomous driving service, a remote driving service, and an extended sensor-based V2X service. In addition, the NR V2X may provide a public safety service by supporting a direct communication service between terminals in an area without network infrastructure.

Hereinafter, a sidelink (SL) may refer to a transmission/reception path for a signal between a terminal and a terminal or a transmission/reception path for a signal between a terminal and a sidelink relay, and may be used interchangeably with a PC5 interface. Hereinafter, a base station may correspond to a subject that performs resource allocation of a terminal and a sidelink relay, and may include a base station supporting both V2X communication and general cellular communication, or a base station supporting only V2X communication. That is, the base station may refer to an NR base station (e.g., gNB), an LTE base station (e.g., eNB), or a road site unit (RSU). A terminal may include not only a general user equipment and mobile station, but also all of a vehicle supporting vehicle-to-vehicle (V2V) communication, a vehicle or a handset (e.g., a smartphone) of a pedestrian supporting vehicle-to-pedestrian communication (V2P), a vehicle supporting vehicle-to-network (V2N) communication, a vehicle supporting vehicle-to-infrastructure (V21) communication, an RSU equipped with a terminal function, an RSU equipped with a base station function, or an RSU equipped with a portion of a base station function and a portion of a terminal function.

In the disclosure, a terminal may refer to a vehicle supporting vehicle-to-vehicle (V2V) communication, a vehicle or a handset (e.g., a smartphone) of a pedestrian supporting vehicle-to-pedestrian communication (V2P), a vehicle supporting vehicle-to-network (V2N) communication, and a vehicle supporting vehicle-to-infrastructure (V21) communication. The terminal may refer to a user device supporting communication between devices of a public safety net.

In addition, in the disclosure, the terminal may refer to a road side unit (RSU) equipped with a terminal function, an RSU equipped with a base station function, or an RSU equipped with a portion of a base station function and a portion of a terminal function.

The sidelink relay in the disclosure may refer to a vehicle supporting V2X communication and a user device supporting communication between devices of a public safety net. In addition, in the disclosure, the sidelink relay may refer to a device equipped with a terminal function, a device equipped with a base station function, or a device equipped with a portion of a base station function and a portion of a terminal function.

Figure 2:
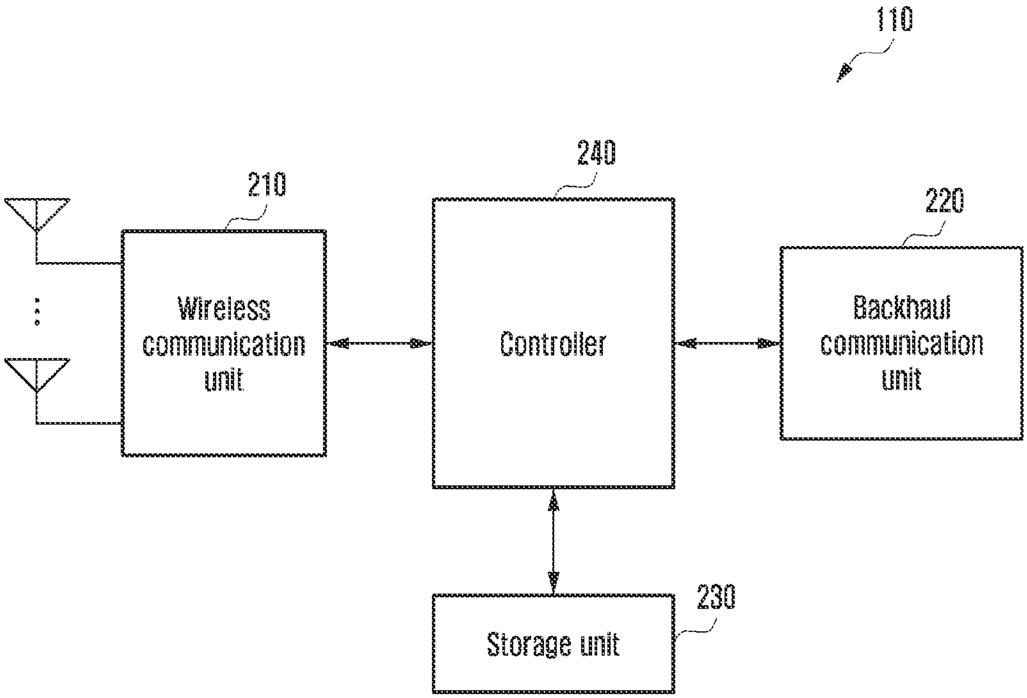
FIG. 2 is a view illustrating a configuration of a base station in a wireless communication system according to an embodiment of the disclosure.

FIG. 2 is a view illustrating a configuration of a base station in a wireless communication system according to an embodiment of the disclosure.

The configuration illustrated in FIG. 2 may be understood as a configuration of the base station 110. Terms such as " . . . unit", " . . . part" or the like used below refers to a unit that processes at least one function or operation, and may be implemented by hardware, software, or a combination of hardware and software.

Referring to FIG. 2, the base station 110 may include a wireless communication unit 210, a backhaul communication unit 220, a storage unit 230, and a controller 240. However, the components of the base station 110 are not limited to the examples described above. For example, the base station may include more or fewer components than the above-described components. In addition, the wireless communication unit 210, the backhaul communication unit 220, the storage unit 230, and the controller 240 may be implemented in a form of a single chip. Furthermore, the controller 240 may include one or more processors.

The wireless communication unit 210 may perform functions for transmitting or receiving a signal through a wireless channel. For example, the wireless communication unit 210 may perform a conversion function between a baseband signal and a bit stream according to a physical layer standard of a system. For example, in case of transmitting data, the wireless communication unit 210 may generate complex symbols by coding and modulating a transmission bit stream. In addition, in case of receiving data, the wireless communication unit 210 may restore a bit stream by demodulating and decoding a baseband signal.

In addition, the wireless communication unit 210 up-converts the baseband signal into a radio frequency (RF) band signal and transmits the RF band signal through an antenna, and down-converts the RF band signal received through the antenna into a baseband signal. To this end, the wireless communication unit 210 may include a transmission filter, a reception filter, an amplifier, a mixer, an oscillator, a digital to analog converter (DAC), an analog to digital converter (ADC), and the like. In addition, the wireless communication unit 210 may include multiple transmission/reception paths. Furthermore, the wireless communication unit 210 may include at least one antenna array including multiple antenna elements.

In terms of hardware, the wireless communication unit 210 may include a digital unit and an analog unit, and the analog unit may include multiple sub-units according to operating power, operating frequency, and the like. The digital unit may be implemented as at least one processor (e.g., a digital signal processor (DSP)).

The wireless communication unit 210 transmits and receives signals as described above. Accordingly, the entirety or a portion of the wireless communication unit 210 may be referred to as a "transmitter", "receiver", or "transceiver". In addition, in a following description, transmission and reception performed through a wireless channel are used as a meaning including performing the above-described processing by the wireless communication unit 210.

The backhaul communication unit 220 may provide an interface for performing communication with other nodes in the network. That is, the backhaul communication unit 220 may convert a bit stream transmitted from the base station 110 to another node, for example, another access node, another base station, an upper node, and a core network, and convert a physical signal received from another node into a bit stream.

The storage unit 230 may store data such as a basic program, an application program, and configuration information for an operation of the base station 110. The storage unit 230 may be configured as a volatile memory, a nonvolatile memory, or a combination of a volatile memory and a nonvolatile memory. In addition, the storage unit 230 may provide stored data according to a request of the controller 240.

The controller 240 may control general operations of the base station 110. For example, the controller 240 may transmit and receive a signal through the wireless communication unit 210 or the backhaul communication unit 220. In addition, the controller 240 records and reads data in the storage unit 230. The controller 240 may perform functions of a protocol stack required by a communication standard. According to another embodiment, the protocol stack may be included in the wireless communication unit 210. To this end, the controller 240 may include at least one processor. According to embodiments, the controller 240 may control the base station 110 to perform operations according to embodiments described below.

Figure 3:
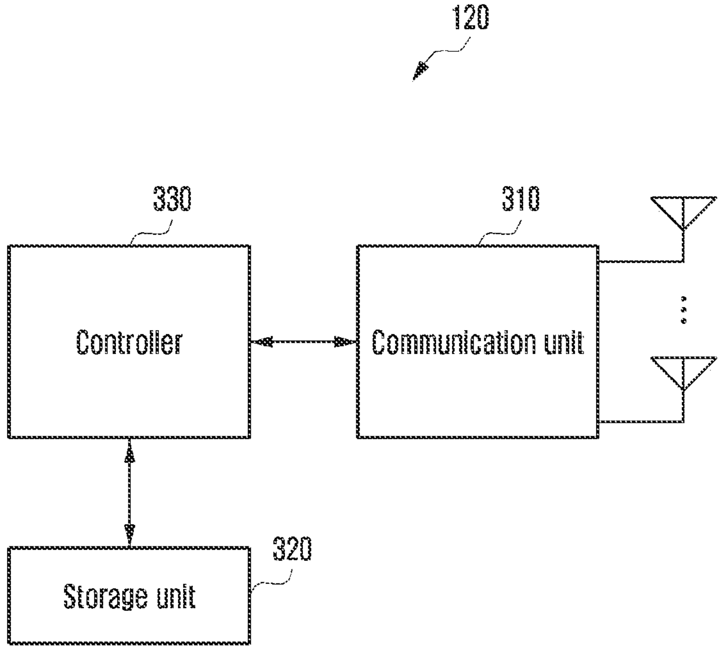
FIG. 3 is a view illustrating a configuration of a terminal in a wireless communication system according to an embodiment of the disclosure.

FIG. 3 is a view illustrating a configuration of a terminal in a wireless communication system according to an embodiment of the disclosure.

The configuration illustrated in FIG. 3 may be understood as a configuration of the terminal 120. Terms such as "... unit", "... part" or the like used below refers to a unit that processes at least one function or operation, and may be implemented by hardware, software, or a combination of hardware and software.

Referring to FIG. 3, the terminal 120 may include a communication unit 310, a storage unit 320, and a controller 330. However, the components of the terminal 120 are not limited to the examples described above. For example, the terminal 120 may include more or fewer components than the above-described components. In addition thereto, the communication unit 310, the storage unit 320, and the controller 330 may be implemented in a form of a single chip. Furthermore, the controller 330 may include one or more processors.

The communication unit 310 performs a function for transmitting or receiving a signal through a wireless channel. For example, the communication unit 310 may perform a conversion function between a baseband signal and a bit stream according to a physical layer standard of a system. For example, in case of transmitting data, the communication unit 310 may generate complex symbols by coding and modulating a transmission bit stream. In addition, in case of receiving data, the communication unit 310 may restore a bit stream by demodulating and decoding a baseband signal. In addition, the communication unit 310 up-converts a baseband signal into a RF band signal and transmits the RF band signal through an antenna, and down-converts an RF band signal received through the antenna into a baseband signal. For example, the communication unit 310 may include a transmission filter, a reception filter, an amplifier, a mixer, an oscillator, a DAC, an ADC, and the like.

In addition, the communication unit 310 may include multiple transmission/reception paths. Furthermore, the communication unit 310 may include at least one antenna array including multiple antenna elements. In terms of hardware, the communication unit 310 may include a digital circuit and an analog circuit (e.g., radio frequency integrated circuit (RFIC)). Here, the digital circuit and the analog circuit may be implemented as a single package. In addition, the communication unit 310 may include multiple RF chains. Furthermore, the communication unit 310 may perform beamforming.

The communication unit 310 may transmit and receive signals as described above. Accordingly, the entirety or a portion of the communication unit 310 may be referred to as a "transmitter", "receiver", or "transceiver". In addition, in the following description, transmission and reception performed through a wireless channel may be used as a meaning including performing the above-described processing by the communication unit 310.

The storage unit 320 may store data such as a basic program, an application program, and configuration information for an operation of the terminal 120. The storage unit 320 may be configured as a volatile memory, a nonvolatile memory, or a combination of a volatile memory and a nonvolatile memory. In addition, the storage unit 320 may provide stored data according to a request of the controller 330.

The controller 330 may control general operations of the terminal 120. For example, the controller 330 may transmit and receive a signal through the communication unit 310. In addition, the controller 330 records and reads data in the storage unit 320. The controller 330 may perform functions of a protocol stack required by a communication standard. To this end, the controller 330 may include at least one processor or a micro-processor, or may be a portion of the processor. In addition, a portion of the communication unit 310 and the controller 330 may be referred to a communication processor (CP). According to embodiments, the controller 330 may control the terminal 120 to perform operations according to embodiments described below.

Figure 4:
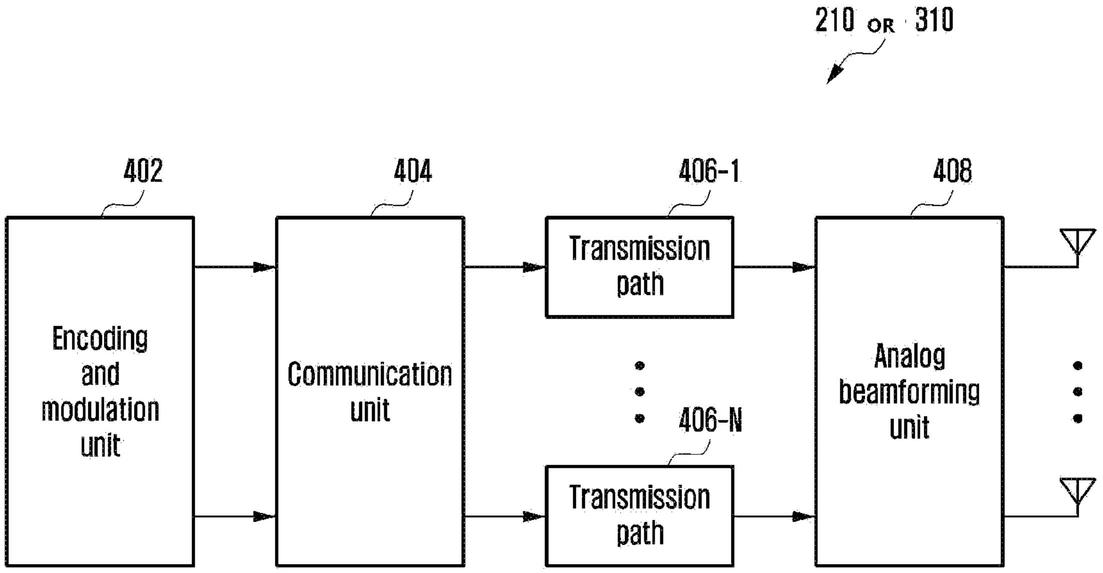
FIG. 4 is a view illustrating a configuration of a communication unit in a wireless communication system according to an embodiment of the disclosure.

FIG. 4 is a view illustrating a configuration of a communication unit in a wireless communication system according to an embodiment of the disclosure.

FIG. 4 illustrates an example of a detailed configuration of the wireless communication unit 210 in FIG. 2 or the communication unit 310 in FIG. 3. Specifically, FIG. 4 illustrates components for performing beamforming as a portion of the wireless communication unit 210 in FIG. 2 or the communication unit 310 in FIG. 3.

Referring to FIG. 4, the wireless communication unit 210 or the communication unit 310 may include an encoding and modulation unit 402, a digital beamforming unit 404, multiple transmission paths 406-1 to 406-N, and an analog beamforming unit 408.

The encoding and modulation unit 402 may perform channel encoding. For channel encoding, at least one of a low density parity check (LDPC) code, a convolution code, and a polar code may be used. The encoding and modulation unit 402 generates modulation symbols by performing constellation mapping.

The digital beamforming unit 404 may perform beamforming with respect to a digital signal (e.g., modulation symbols). To this end, the digital beamforming unit 404 multiplies modulation symbols by beamforming weights. Here, the beamforming weights are used to change a magnitude and phase of a signal, and may be referred to as a precoding matrix, a pre-coder, or the like. The digital beamforming unit 404 may output digital-beamformed modulation symbols to the multiple transmission paths 406-1 to 406-N. In this case, according to a multiple input multiple output (MIMO) transmission scheme, modulation symbols may be multiplexed or the same modulation symbols may be provided to multiple transmission paths 406-1 to 406-N.

The multiple transmission paths 406-1 to 406-N may convert a digital-beamformed digital signal into an analog signal. To this end, each of the multiple transmission paths 406-1 to 406-N may include an inverse fast forwarder transform (IFFT) operation unit, a cyclic prefix (CP) insertion unit, a DAC, and an up-conversion unit. The CP insertion unit is for an orthogonal frequency division multiplexing (OFDM) scheme, and may be excluded in case that another physical layer scheme (e.g., filter bank multi-carrier (FBMC)) is applied. That is, the multiple transmission paths 406-1 to 406-N may provide an independent signal processing process for multiple streams generated through digital beamforming. However, depending on an implementation manner, a portion of the components of the multiple transmission paths 406-1 to 406-N may be used in common.

The analog beamforming unit 408 may perform beamforming with respect to an analog signal. To this end, the digital beamforming unit 404 multiplies analog signals by beamforming weights. Here, the beamforming weights are used to change a magnitude and phase of a signal. Specifically, according to multiple transmission paths 406-1 to 406-N and a connection structure between antennas, the analog beamforming unit 440 may be variously configured. For example, each of the multiple transmission paths 406-1 to 406-N may be connected to one antenna array. For another example, the multiple transmission paths 406-1 to 406-N may be connected to one antenna array. For another example, the multiple transmission paths 406-1 to 406-N may be adaptively connected to one antenna array or two or more antenna arrays.

Figure 5:
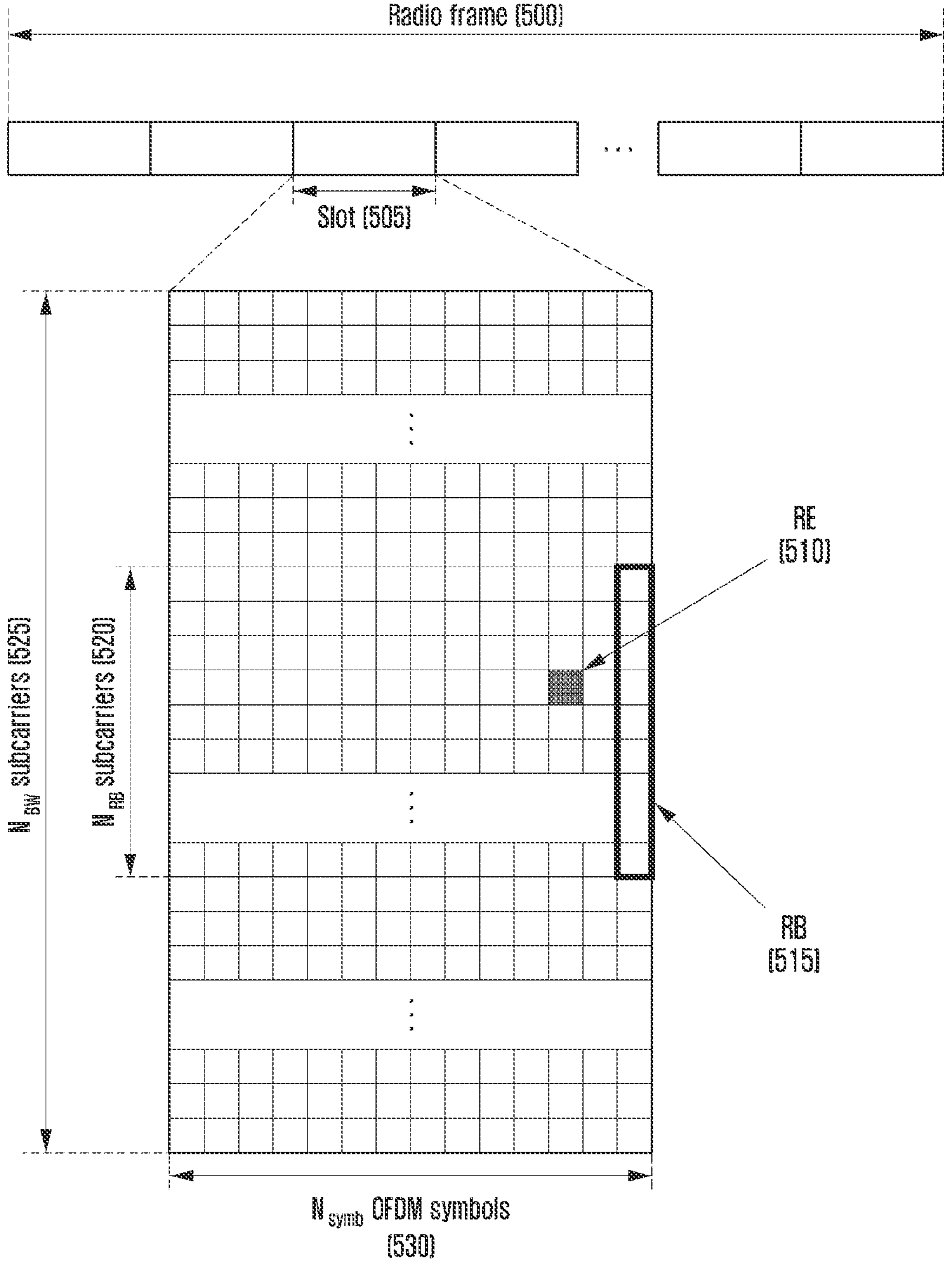
FIG. 5 is a view illustrating a structure of a time-frequency domain of a wireless communication system according to an embodiment of the disclosure.

FIG. 5 is a view illustrating a structure of a time-frequency domain of a wireless communication system according to an embodiment of the disclosure.

Referring to FIG. 5, in the radio resource region, a horizontal axis indicates a time domain and a vertical axis indicates a frequency domain. A minimum transmission unit in the time domain is an OFDM symbol or DFT-S-OFDM symbol, and $N_{symb}$ OFDM symbols or DFT-S-OFDM symbols 530 may be included in one slot 505. Unlike slots, a length of a subframe in the NR system may be defined to be 1.0 ms, and a length of a radio frame 500 may be defined to be 10 ms. A minimum transmission unit in the frequency domain is a subcarrier, and a bandwidth of the entire system transmission bandwidth may include a total of $NH_{BW}$ subcarriers 525. Specific values of $N_{symb}$, $N_{BW}$, etc. may be variably applied depending on the system.

A basic unit of in the time-frequency resource domain is a resource element (hereinafter, "RE") 510, and may be indicated by an OFDM symbol index or DFT-S-OFDM symbol index and a subcarrier index. A resource block (RB) 515 may be defined as $N_{RB}$ consecutive subcarriers 520 in the frequency domain. In general, a minimum transmission unit of data is an RB unit, and generally $N_{symb}$=14 and $N_{RB}$=12 in the NR system.

The time-frequency resource structure of FIG. 5 may be applied to the Uu interface. In addition, the time-frequency resource structure of FIG. 5 may be similarly applied to the sidelink as well.

A sidelink relay may be authenticated to be used for at least one of a specific service, a specific terminal, a specific sidelink flow, a specific sidelink bearer, a specific unicast link, a specific source identifier, and a specific destination identifier. The sidelink relay may configure a direct connection with an authenticated terminal at the time of installation. In an example, the sidelink relay may transmit a sidelink relay search message and perform a sidelink direct connection configuration procedure with the authenticated terminal. In another example, the sidelink relay may receive a sidelink relay search message from the authenticated terminal, transmit the sidelink relay search message to the authenticated terminal, and perform a sidelink direct connection configuration procedure with the corresponding terminal. In various examples, the sidelink relay search message may be understood as a message mutually transmitted to initiate a sidelink relay search procedure between the sidelink relay and the terminal, and may include a message for searching or a message for requesting searching. Configuration information required for a sidelink relay and a sidelink remote terminal to transmit or receive a sidelink relay search message may obtained from the base station or configured in advance.

A terminal may be authenticated to use a sidelink direct connection in at least one of a specific service, a specific terminal, a specific sidelink flow, a specific sidelink bearer, a specific unicast link, a specific source identifier, and a specific destination identifier. In an example, the terminal may transmit a sidelink search message to search for another terminal capable of performing sidelink direct connection configuration and perform a sidelink direct connection configuration procedure with an authenticated terminal. In another example, the terminal may receive a sidelink search message from the authenticated terminal, transmit the sidelink search message to the authenticated terminal, and perform a sidelink direct connection configuration procedure with the corresponding terminal.

In order for the terminal in the RRC_INACTIVE state to receive a paging message transmitted by the base station, the terminal may identify whether it is located within a registered RAN notification area, and if it is determined that it is out of the registered RAN notification area, a procedure for re-registering the RAN notification area may be performed. The RRC-INACTIVE terminal may determine RAN notification area information managed by the corresponding base station through a system information block (SIB) message transmitted by the base station. When it is determined that the RAN notification area managed by the base station and the RAN notification area registered while entering the RRC_INACTIVE state do not match, the terminal may perform an RNA update (RNAU) procedure through the base station and may be registered in a new RAN notification area.

In case that a periodic RNAU timer (e.g., T380) is configured to periodically perform the RNA update procedure through the RRC release message received from the base station, the RRC_INACTIVE terminal may perform the RNA update procedure whenever T380 expires. The RNAU procedure performed when the terminal determines that the RNAU timer T380 has expired or the RAN notification area indicated by the SIB message received from the base station is not identical to the RAN notification area in which the terminal is registered is as shown in [Table 1].

TABLE 1

| |
|---|
| In RRC_INACTIVE state, the UE shall: |
| 1> if T380 expires; or |
| 1> if RNA Update is triggered at reception of SIB1 // When it is determined that the RNA obtained from SIB1 is not the RNA configured for the terminal: |
| 2> initiate RRC connection resume procedure with resumeCause set to rna-Update; |
| 1> if barring is alleviated for Access Category '8' or Access Category '2': |
| 2> if upper layers do not request RRC the resumption of an RRC connection, and |
| 2> if the variable pendingRNA-Update is set to true: |
| 3> initiate RRC connection resume procedure with resumeCause value set to rna-Update. |

Figure 6A:
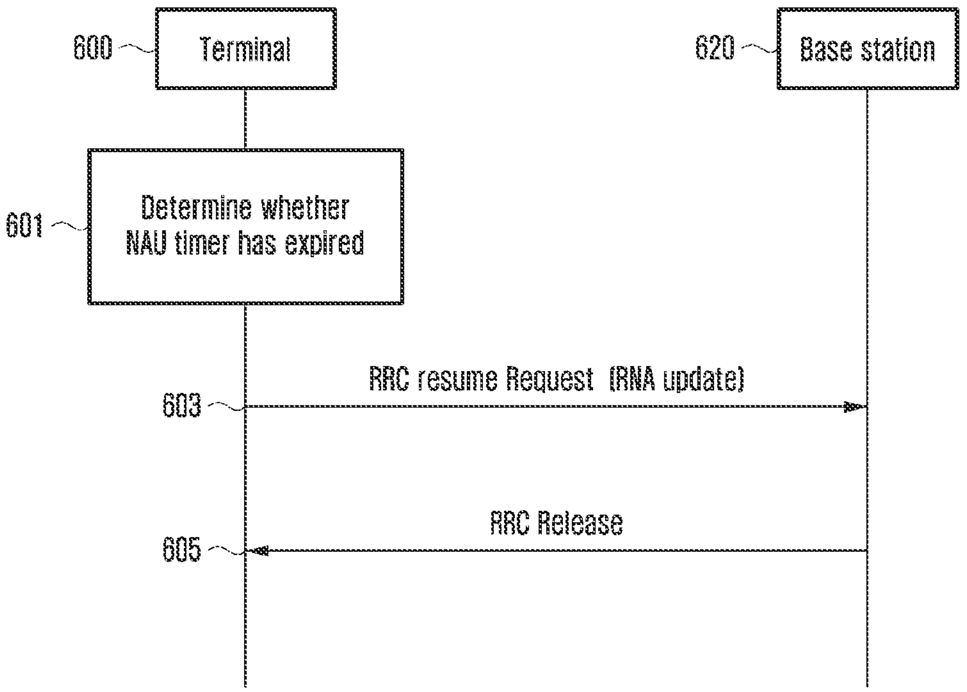
FIG. 6A is a view illustrating a periodic RNAU procedure based on a timer in case that a terminal is directly connected to a base station and is in an RRC_INACTIVE state.

FIG. 6A is a view illustrating a periodic RNAU procedure based on a timer in case that a terminal is directly connected to a base station and is in an RRC_INACTIVE state.

Referring to FIG. 6A, in case that the RNAU timer to be applied to periodically perform the RNAU procedure in the RRC_INACTIVE state is configured from the base station 620, the terminal 600 in the RRC_INACTIVE state may determine whether the periodic RNAU timer has expired in operation 601.

When it is determined that the RNAU procedure is required to be performed because the periodic RNAU timer expires in operation 601, the terminal 600 may transmit an RRC Resume Request message to the base station 620 in operation 603. In operation 603, the terminal 600 may transmit the RRC Resume Request message in which a Resume cause value is configured as ma-Update to indicate the RNAU to be performed.

The base station 620 receives the RRC Resume Request message in which the Resume cause value is configured as ma-Update from the terminal 600, and when the periodic RNAU of the terminal 600 has been successfully performed and the terminal 600 is required to continue to stay in the RRC_INACTIVE state, may transmit an RRC release message to the terminal 600 in operation 605. The RRC release message may configure parameters to be applied by the terminal 600 in the RRC_INACTIVE state. The parameter may include suspend config information, and for example, at least one of I-RNTI (RRC_INACTIVE terminal identifier), an RAN paging cycle, RAN notification area information, and periodic RNAU timer value, or a combination thereof.

In case that the terminal is connected to the base station/network through the sidelink relay, the RRC_INACTIVE terminal may perform a timer-based periodic RNAU procedure through a serving sidelink relay thereof. An example in which the terminal performs a periodic RNAU procedure while being connected to the sidelink relay will be described with reference to FIG. 6B.

Figure 6B:
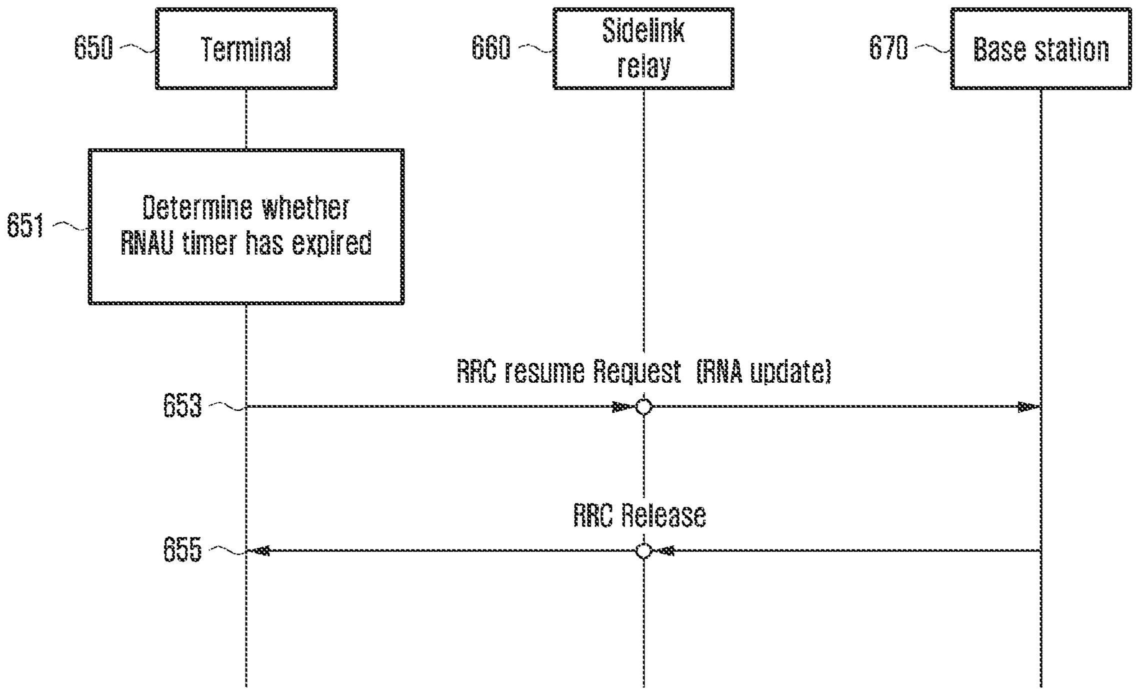
FIG. 6B is a view illustrating a periodic RNAU procedure based on a timer in case that a terminal is connected to a base station through a sidelink relay and is in an RRC_INACTIVE state.

FIG. 6B is a view illustrating a periodic RNAU procedure based on a timer in case that a terminal is connected to a base station through a sidelink relay and is in an RRC_INACTIVE state.

Referring to FIG. 6B, in case that the RNAU timer to be applied to periodically perform the RNAU procedure in the RRC_INACTIVE state is configured from the base station 670, the terminal 650 in the RRC_INACTIVE state may determine whether the periodic RNAU timer has expired in operation 651.

When it is determined that the RNAU procedure is required to be performed because the periodic RNAU timer expires in operation 651, the terminal 650 may transmit an RRC Resume Request message to the base station 670 through relay transmission of the sidelink relay 660 in operation 653. In operation 653, the terminal 650 may transmit the RRC Resume Request message in which a Resume cause value is configured as ma-Update to indicate the RNAU to be performed.

The base station 670 receives the RRC Resume Request message in which the Resume cause value is configured as ma-Update from the terminal 650, and when the periodic RNAU of the terminal 650 has been successfully performed and the terminal 650 is required to continue to stay in the RRC_INACTIVE state, may transmit an RRC release message to the terminal 650 in operation 655. The RRC release message in operation 655 may be transmitted to the terminal 650 through relay transmission of the sidelink relay 660, furthermore, the RRC release message may configure parameters to be applied by the terminal 650 in the RRC_INACTIVE state. The parameter may include suspend config information, and for example, at least one of I-RNTI (RRC_INACTIVE terminal identifier), an RAN paging cycle. RAN notification area information, and periodic RNAU timer value, or a combination thereof.

Meanwhile, when the terminal is connected to the base station through the sidelink relay and is in the RRC_INACTIVE state, the RNAU procedure may be performed in the case of the following [Table 2] in addition to performing the timer-based periodic RNAU procedure.

TABLE 2

| |
|---|
| When the Remote UE is in RRC_INACTIVE state and the Remote UE is connected to Relay UE via PC5 and the serving cell of Relay UE from which paging message is delivered belongs to different RNA, the Remote UE performs RNA update irrespective of periodic RNAU timer. (That is, when the serving cell of the relay UE belongs to an RNA different from the RNA configured for the terminal, the terminal may perform the RNAU procedure. RNA information of the serving cell of the relay UE may be transmitted through an SIB message received from the relay UE, a sidelink search message received from the relay UE, or a PC5-RRC messsage transmitted from the relay UE to the terminal.) |

RNAU timer used when the terminal performs the RNAU procedure through the sidelink relay. For example, the RNAU timer used by the terminal for direct connection with the base station may be configured as T380, and the RNAU timer used when the terminal is connected to the base station through a sidelink relay may be configured as T380-indirect. For another example, the RNAU timer used by the terminal for direct connection with the base station may be configured as T380, and a timer value may be configured as value-A, while the RNAU timer used when the terminal is connected to the base station through a sidelink relay may be configured as T380, and a timer value may be configured as value-B. For still another example, the RNAU timer used by An embodiment in FIG. 6A or 6B, the RNAU timer applied when the terminal performs periodic timer-based RNAU through direct connection with the base station or periodic timer-based RNAU through connection with the sidelink relay may be obtained through the RRC release message transmitted from the base station to the terminal. The RNAU timer used when the terminal performs the RNAU procedure through direct connection with the base station may be configured identical to or different from the the terminal for direct connection with the base station may be configured as T380, and a timer value thereof may be configured as value-C, while the RNAU timer used when the terminal is connected to the base station through a sidelink relay may be configured as T380, and a timer value may be configured as value-C. Various examples in which the base station configures the periodic RNAU timer of the terminal supporting sidelink relay are shown in [Table 3].

TABLE 3

- (case 1) gNB can configure different values (PeriodicRNAU-TimerValue) of T380 to Remote UE via RRCRelease (suspend-config).

One value (PeriodicRNAU-TimerValue, value-A) is set as T380 for Remote UE connected via Relay UE, another value (PeriodicRNAU-TimerValue, value-B) is set as T380 for Remote UE directly connected to gNB.

- (case 2) gNB can configure a new timer T380-indirect to Remote UE via RRCRelease (suspend-config) when the Remote UE is connected via Relay UE.

The T380-indirect timer is used for periodic RNAU while RRC_INACTIVE Remote UE is connected with Relay UE. PeriodicRNAU-TimerValue is set as T380-indirect.

- (case 3) gNB can configure both timers (T380, T380-indirect) or two values (PeriodicRNAU-TimerValue, value-A, value-B) to Remote UE via RRCRelease (suspend-config)

T380-indirect timer or T380 with value-B is used for periodic RNAU while RRC_INACTIVE Remote UE is connected with Relay UE.
T380 timer or T380 with value-A is used for periodic RNAU while RRC_INACTIVE Remote UE is connected to gNB directly.
If the base station configures the T380 timer but does not configure the T380-indirect timer to the terminal, the terminal may be connected to the sidelink relay, and may apply the T380 timer to perform the periodic RNAU when in the RRC_INACTIVE state.
The terminal may receive the RRC release message through direct connection with the base station or through relay transmission of the sidelink relay. When it is determined that the RRC release message received by the terminal includes the T380 timer, T380-indiect timer, the T380 timer with Value-A, or the T380 timer with Value-B, the terminal may determine whether it is direct connection with the base station or connection with the sidelink relay and a periodic RNAU timer value to be used for the direction connection or the connection with the sidelink relay. For example, when the terminal is directly connected to the base station and configured with T380, the terminal may perform the periodic RANU procedure according to a T380 value. For example, when the terminal is directly connected to the base station and configured with T380 (with Value-A), the terminal may perform the periodic RANU procedure according to T380 configured to have Value-A. For example, when the terminal is connected to the sidelink relay and configured with T380-indirect, the terminal may perform the periodic RANU procedure according to a T380-indirect value. For example, when the terminal is connected to the sidelink relay and configured with T380 (with ValueB), the terminal may perform the periodic RANU procedure according to T380 configured to have Value-B.i The examples in [Table 3] are cases in which the base station configures the RNAU timer used by the terminal to perform the periodic RNAU procedure through the RRC release message transmitted from the base station to the terminal. Here, the RRC release message may be transmitted from the base station to the terminal (direct connection) or transmitted to the terminal through the sidelink relay. For another example, when the terminal is connected through the sidelink relay, the sidelink relay may configured an RNAU timer to the terminal by usinga PC5 RRC message. Here, the sidelink relay may be configured with an RAU timer (information of at least one of or combination of case 1, case 2, and case 3 in Table 3 above) from the base station.

By way of example, as shown in [Table 3], in case that the RNAU timer is configured through the RRC release message transmitted by the base station to the terminal, a processing operation for the sidelink relay to relay and transmit the RRC release message to the terminal is as shown in [Table 4] below.

TABLE 4

| |
|---|
| A gNB may transmit an RRCRelease message including periodic timer information of the terminal to the sidelink relay. In order to indicate that the RRCRelease message is transmitted to the terminal, a Uu radio bearer (RB) configuration corresponding to the RRCRelease message may be applied to The RRCRelease message to be transmitted, and a Uu adaptation PDU including the RRCRelease message may include a remote UE ID of the terminal. The sidelink relay may process header information of the Uu adaptation PDU and an RB configuration to determine the message to be relayed and transmitted to the terminal. By the sidelink relay, RBID corresponding to the RRC message of the terminal may be included in a header of a PC5 adaptation PDU, an SRC ID in a header of a MAC PDU, a DST ID in a Layer-2 ID of the sidelink relay, an LCID in a Layer-2 ID of the terminal, and an LCID of a corresponding RB in the RRC message of the terminal. That is, the sidelink relay may apply the corresponding PC5 RB configuration to the RRCRelease message to be transmitted to the termina through the PC5 interface. |

In case that the RRC_INACTIVE terminal is connected to the sidelink relay and configured with T380-indirect to perform the periodic RNAU procedure, an operation of the terminal to process cases of starting the T380-indirect timer, stopping the T380-indirect timer, and T380-indirect timer expiration is as shown in [Table 6] below.

TABLE 6

| Timer | Start | Stop | At expiry |
|---|---|---|---|
| T380-indirect | Upon reception of T380-indirect in RRCRelease via Relay UE. | Upon reception of RRCResume, RRCSetup or RRCRelease. Upon disconnected from Relay UE and directly camping on a cell in the same RNA | Perform the actions e.g. perform RNA update procedures |

For another example, in case that the sidelink relay obtains the RNAU timer (information of at least one of or a combination of case 1 case 2, and case 3 in Table 3 above) from the base station as configuration information, and configures the periodic RNAU timer to the terminal through a PC5-RRC message to the terminal periodically to the RNAU timer, a processing operation forth sidelink relay to configure RNAU timer configuration information to the terminal through the PC5-RRC message is as show in [Table 5] below.

TABLE 5

| |
|---|
| The relay UE may obtain information on the periodic RNAU timer to be used in the RRC_INACTIVE state, transmitted from the gNB. The Periodic RNAU timer information may be obtained through an SIB message for a sidelink relay purpose transmitted by the base station or an RRC message transmitted from the base station to the sidelink relay. |
| In an embodiment, the sidelink relay may configure the SIB message including the periodic RNAU timer information obtained through the SIB message of the base station into a PC5 RRC message and transmit the PC5 RRC message to the terminal. The PC5 RRC message may correspond to a message defined to transfer the SIB message through the PC5 interface. |
| In an embodiment, the sidelink relay may configure a PC5 RRC message including the periodic RNAU timer information obtained through the SIB message of the base station and transmit the PC5 RRC message to the terminal. The PC5 RRC message may correspond to an RRCReconfigurationSidelink message. |
| In an embodiment, the sidelink relay may configure a PC5 RRC message when the periodic RNAU timer information transmitted from the base station through the RRC message is obtained, and transmit the PC5 RRC message to the terminal. The PC5 RRC message may correspond to an RRCReconfigurationSidelink message. |

In case that the RRC_INACTIVE terminal is directly connected to base station or connected to the sidelink relay and configured with T380 to perform the periodic RNAU procedure, an operation of the terminal to process cases of starting the T380 timer, stopping the T380 timer, and T380 timer expiration is as shown in [Table 7] below.

TABLE 7

| Timer | Start | Stop | At expiry |
|---|---|---|---|
| T380 | Upon reception of T380 in RRCRelease | Upon reception of RRCResume, RRCSetup or RRCRelease. Upon connected to Relay UE in the same RNA | Perform the actions e.g. perform RNA update procedures |

An operation of a case in which the terminal is connected to the sidelink relay and receives the RRC Resume message from the base station through the sidelink relay is as shown in [Table 8] below. When the RRC Resume message is received, the terminal may stop the periodic RNAU timer, for example, T380-indirect or T380, which is configured through the RRC release message and operated in the terminal.

TABLE 8

| Reception of the RRCResume by the UE (when RRC_INACTIVE Remote UE is connected to a Relay UE) |
|---|
| The UE shall: |
| 1> stop timer T319; |
| 1> stop timer T380-indirect, if running; (or stop timer T380, if running;) |
| 1> if the RRCResume includes the fullConfig: |
| 2> perform the full configuration procedure as specified in 5.3.5.11; |
| 1> else: |
| ... |
| 1> enter RRC_CONNECTED; |
| 1> indicate to upper layers that the suspended RRC connection has been resumed; |
| 1> stop the cell re-selection procedure if any; |
| 1> consider the serving cell of its PC5 connected Relay UE as its serving cell |

An operation of a case in which the terminal is connected to the sidelink relay and receives the RRC Setup message from the base station through the sidelink relay is as shown in [Table 9] below. When the RRC Setup message is received, the terminal may stop the periodic RNAU timer, for example T380-indirect or T380, which is configured through the RRC release message and operated in the terminal.

TABLE 9

| Reception of the RRCSetup by the UE (when RRC_INACTIVE Remote UE is connected to a Relay UE) |
|---|
| The UE shall: |
| 1> perform the RRC connection setup procedure as specified in below. |
| The UE shall perform the following actions upon reception of the RRCSetup: |
| 1> if the RRCSetup is received in response to an RRCReestablishmentRequest; or |
| 1> if the RRCSetup is received in response to an RRCResumeRequest or RRCResumeRequest1: |
| 2> discard any stored UE Inactive AS context and suspendConfig; |
| 2> discard any current AS security context including the $K_{RRCenc}$ key, the $K_{RRCint}$ key, the $K_{UPint}$ key and the $K_{UPenc}$ key; |
| 2> release radio resources for all established RBs except SRB0, including release of the RLC entities, of the associated PDCP entities and of SDAP if any RLC entities have been established over Uu; |
| 2> release the RRC configuration except for the default L1 parameter values, default MAC Cell Group configuration and CCCH configuration; |
| 2> indicate to upper layers fallback of the RRC connection; |
| 2> stop timer T380-indirect, if running; (or stop timer T380, if running;) |
| 1> perform the cell group configuration procedure in accordance with the received masterCellGroup and as specified in 38.331 subclause 5.3.5.5; |
| 1> perform the radio bearer configuration procedure in accordance with the received radioBearerConfig and as specified in 38.331 subclause 5.3.5.6; |
| 1> if stored, discard the cell reselection priority information provided by the cellReselectionPriorities or inherited from another RAT; |
| 1> stop timer T300, T301 or T319 if running; (or stop timer T300-indirect, T301-indirect or T319-indirect if running) |
| 1> if the RRCSetup is received in response to an RRCResumeRequest, RRCResumeRequest1 or RRCSetupRequest: |
| 2> if T331 is running: |
| 3> stop timer T331; (or if T331-indirect is running, stop timer T331-indirect) |
| 3> perform the actions as specified in 38.331 subclause 5.7.8.3; |
| 2> enter RRC_CONNECTED; |
| 2> stop the cell re-selection procedure if any; |
| 1> consider the serving cell of its PC5 connected Relay UE as its serving cell |

An operation of a case in which the terminal is connected to the sidelink relay and receives the RRC release message from the base station through the sidelink relay is as shown in [Table 10] below. When the RRC release message is received, the terminal may stop the periodic RNAU timer, for example, T380-indirect or T380, which is configured through the previous RRC release message and operated in the terminal. When the RRC release message is received, and it is determined that the periodic RNAU timer, for example. T380-indirect or T380 is configured, the terminal may start an operation of the T380-indirect timer or the T380 timer.

TABLE 10

| Reception of the RRCRelease by the UE (when RRC_INACTIVE Remote UE is connected to a Relay UE) |
|---|
| The UE shall: |
| 1> perform the actions as specified in below. |
| The UE shall: |
| 1> delay the following actions defined in this sub-clause 60 ms from the moment the RRCRelease message was received or optionally when lower layers indicate that the receipt of the RRCRelease message has been successfully acknowledged, whichever is earlier; |
| 1> stop timer T380-indirect, if running; (or stop timer T380, if running;) |
| ... |
| 1> if the AS security is not activated: |
| 2> ignore any field included in RRCRelease message except waitTime; |
| 2> perform the actions upon going to RRC_IDLE as specified in 38.331 subclause 5.3.11 with the release cause 'other' upon which the procedure ends; |
| 1> if the RRCRelease message includes redirectedCarrierInfo indicating redirection to eutra: |
| 2> if cnType is included: |
| 1> if the RRCRelease includes suspendConfig: |
| 2> apply the received suspendConfig; |
| 2> if the T380-indirect is included: |
| 3> start timer T380-indirect, with the timer value set to T380-indirect; |
| 2> else if the T380 is included: |
| 3> start timer T380, with the timer value set to T380; |
| 2> indicate the suspension of the RRC connection to upper layers; |
| 2> enter RRC_INACTIVE and perform cell selection as specified in TS 38.304; |
| 1> else |
| 2> perform the actions upon going to RRC_IDLE as specified in 38.331 subclause 5.3.11, with the release cause 'other'. |

Figure 7:
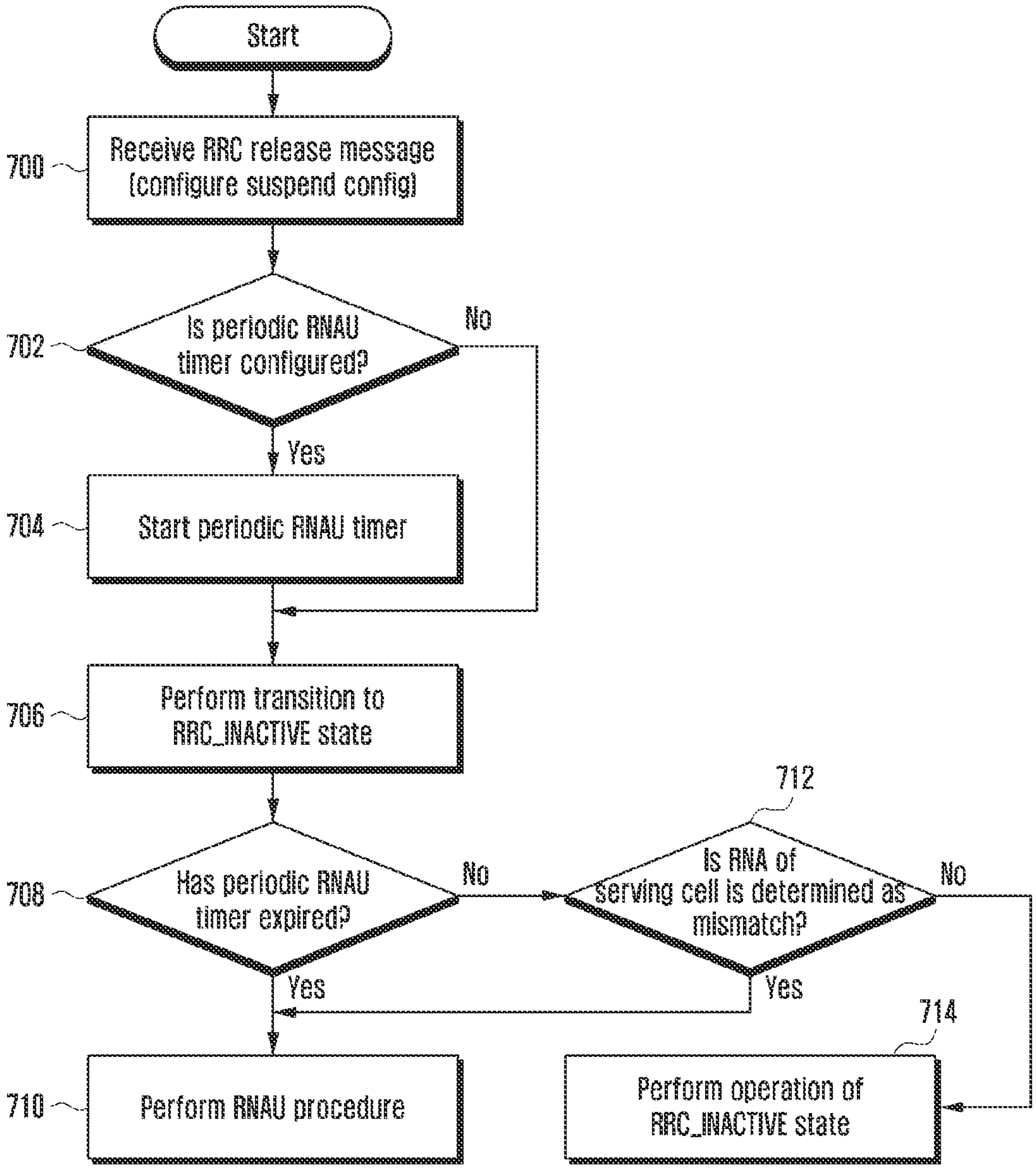
FIG. 7 is a view illustrating an operation in which a terminal is connected to a base station through a sidelink relay, receives an RRC release message, and performs an RNAU procedure in RRC_INACTIVE.

FIG. 7 is a view illustrating an operation in which a terminal is connected to a base station through a sidelink relay, receives an RRC release message, and performs an RNAU procedure in RRC_INACTIVE.

Referring to FIG. 7, in operation 700, the terminal may receive an RRC release message including Suspend Config from the base station through relay transmission of the sidelink relay. The terminal may determine whether the periodic RNAU timer is configured in the RRC release message received in operation 700 to perform the periodic RNAU. Periodic RNAU timer configuration information is as shown in [Table 3] described above.

When it is determined that the periodic RNAU timer is configured in operation 702, the terminal may configure the periodic RNAU timer to a value configured by the base station and start the timer in operation 704.

In operation 706, the terminal may transition to the RRC_INACTIVE state and perform operations (e.g., reception of a paging message relayed and transmitted from the sidelink relay, reception of an SIB relayed and transmitted from the sidelink relay, sidelink relay reselection procedure, cell (re)selection procedure) of the RRC_INACTIVE state. Meanwhile, when it is determined that the periodic RNAU timer is not configured in operation 702, the terminal may transition to the RRC_INACTIVE state in operation 706 without configuring the periodic RNAU timer.

In operation 708, in case that the periodic RNAU timer is operating in the RRC_INACTIVE state, the terminal may determine whether the RNAU timer has expired. When it is determined that the RNAU timer has expired according to the determination in operation 708, the terminal may perform the RNAU procedure as in operation 710.

In operation 712, the terminal may determine whether an RAN notification area managed by the serving cell of the sidelink relay matches an RAN notification area obtained by the terminal through the RRC release message in operation 700.

When it is determined that the RAN notification area managed by the serving cell of the sidelink relay does not match the RAN notification area obtained by the terminal through the RRC release message in operation 700 according to the determination in operation 712, the terminal may proceed to operation 710 and perform the RNAU procedure.

In operation 710, the terminal may receive the RRC release message through relay transmission of the sidelink relay and may process Suspend Config information in case that Suspend Config information is included in the RRC release message. For example, in case that the RAN notification area of the terminal is reconfigured in the RAN notification area managed by the serving cell or the periodic RNAU timer is configured, an operation of configuring the periodic RNAU timer may be performed.

When it is determined that the RAN notification area managed by the serving cell of the sidelink relay matches the RAN notification area obtained by the terminal through the RRC release message in operation 700 according to the determination in operation 712, the terminal may proceed to operation 714 and perform an operation (e.g., reception of a paging message relayed and transmitted from the sidelink relay, reception of an SIB relayed and transmitted from the sidelink relay, sidelink relay reselection procedure, and cell (re)selection procedure) of the RRC_INACTIVE state.

In case that a timer or timer value applied to the periodic RNAU procedure performed by the RRC_INACTIVE terminal in direct connection with the base station is configured separately from a timer or timer value applied to the periodic RNAU procedure performed through connection with the sidelink relay, and the RRC_INACTIVE terminal performs a cell (re)selection or sidelink relay (re)selection procedure, the terminal may change the direct connection with the base station to the connection with the sidelink relay or the connection with the sidelink relay to the direct connection with the base station. For example, in case that the terminal is connected to the sidelink relay from the direct connection with the base station, the terminal may be required to determine whether to continuously use the periodic RNAU timer/timer value which has been in operation during direct connection with the base station even when connected to the sidelink relay. For another example, in case that the terminal is directly connected to the base station from the connection with the sidelink relay, the terminal may be required to determine whether to continuously use the periodic RNAU timer/timer value which has been in operation during connection with the sidelink relay even when directly connected to the base station.

In case that the RRC_INACTIVE terminal is connected through the sidelink relay and then changed to be directly connected to the base station, that is, the terminal directly select the serving cell, and if the RAN notification area of the serving cell is identical to the RAN notification area of the serving cell of the sidelink relay to which the terminal was previously connected, and the periodic timer is in operation and has not expired, the terminal may not perform the RNAU procedure through the serving cell. By way of example, the terminal may continuously use the periodic RNAU timer (T380-indirect, T380, or T380 with Value-B) used when connected to the sidelink relay even when directly connected to the serving cell. When it is determined that the periodic RNAU timer (T380-indirect, T380, or T380 with Value-B) has expired, the terminal may perform the RNAU procedure through the serving cell, and the serving cell may transmit the RRC release message and reconfigure the periodic RNAU timer to the RRC_INACTIVE terminal. In this case, the periodic RNAU timer may be configured to (T380 or T380 with Value-A).

For another example, the terminal may stop the periodic RNAU timer (T380-indirect or T380 with Value-B) used when connected to the sidelink relay, may be directly connected to the base station, and may start to use the periodic RNAU timer (T380 or T380 with Value-A) configured to be used in RRC_INACTIVE. Here, the terminal may configure a periodic RNAU timer value configured to be used when directly connected to the base station to a remaining time (remaining value of T380-indirect timer or remaining value of T380 with Value-B) of the periodic RNAU timer used when connected to the sidelink relay, and start the periodic RNAU timer configured to be used when directly connected to the base station.

In case that the RRC_INACTIVE terminal is connected through the sidelink relay and then directly connected to the base station, the terminal may perform the RNAU procedure through the base station when it is determined that the RAN notification area of the serving cell of the sidelink relay is different from the RAN notification area of the base station even if the periodic RNAU timer has not expired.

In case that the RRC_INACTIVE terminal is directly connected to the base station and then is connected to the base station through the sidelink relay, and if the RAN notification area of the serving cell when the terminal is directly connected to the serving cell is identical to the RAN notification area of the serving cell of the sidelink relay to which the terminal is connected, and the periodic timer is in operation and does not expire, the terminal may not perform the RNAU procedure through the sidelink relay. By way of example, even when the terminal is connected through the sidelink relay, the terminal may continuously use the periodic RNAU timer (T380 or T380 with Value-A) used when directly connected to the base station. When it is determined that the periodic RNAU timer (T380 or T380 with Value-A) has expired, the terminal may perform the RNAU procedure through the sidelink relay, and the RRC release message transmitted by the base station through relay transmission of the sidelink relay may include the RNAU timer to be configured to the RRC_INACTIVE terminal. In this case, the periodic RNAU timer may be configured to (T380-indirect or T380 with Value-B).

For another example, the terminal may stop the periodic RNAU timer (T380 or T380 with Value-A) used when directly connected to the base station and start to use the periodic RNAU timer (T380-indirect or T380 with Value-B) configured to be used in RRC_INACTIVE when connected through the sidelink relay. Here, the terminal may configure a periodic RNAU timer value configured to be used when connected to the sidelink relay to a remaining time (remaining value of T380 timer or remaining value of T380 with Value-A) of the periodic RNAU timer having used when directly connected to the base station, and start the periodic RNAU timer configured to be used when connected through the sidelink relay.

In case that the RRC_INACTIVE terminal is directly connected to the base station and then is connected to the network through the sidelink relay, and when it is determined that the RAN notification area of the previous serving cell of the terminal is different from the RAM notification area of the serving cell of the sidelink relay to which the terminal is connected, the terminal may perform the RNAU procedure through the base station even when the periodic RNAU timer has not expired.

In case that the RRC_INACTIVE terminal is connected through sidelink relay A and then changed to be connected through sidelink relay B, and if an RAN notification area of a serving cell of sidelink relay B is identical to an RAN notification area of a serving cell of sidelink relay A to which the terminal was previously connected, and the periodic timer is in operation and has not expired, the terminal may not perform the RNAU procedure through new sidelink relay B.

In case that the RRC_INACTIVE terminal is connected through sidelink relay A and then changed to be connected through sidelink relay B, and if it is determined that the RAN notification area of the serving cell of sidelink relay B is different from the RAN notification area of the serving cell of sidelink relay A to which the terminal was previously connected, the terminal may perform the RNAU procedure through new sidelink relay B even if the periodic RNAU timer has not expired.

When the terminal in the RRC_INACTIVE state is connected to the sidelink relay, and receives information from the sidelink relay indicating that handover is to be performed or determines a PC5 radio link failure (RLF) with the sidelink relay, the terminal performs a sidelink relay reselection procedure or a cell (re)selection procedure to perform direct connection. The operation of the terminal performing the sidelink relay reselection procedure or the cell (re)selection procedure may occur while the terminal is performing the RNA update procedure, and in this case, there may be situation where the terminal ma fail to find a suitable relay UE, may fail to find suitable cell, or is required to be camped on an acceptable cell. Here, the terminal may perform a procedure for transitioning to RRC_IDLE. The terminal may configure a release cause transmitted to an upper layer thereof to "other" and notify that the RRC connection is released.

An example of a terminal operation is as shown in [Table 11] below.

TABLE 11

| |
|---|
| For example, in case that a condition for the terminal to reselect a sidelink relay is satisfied and a condition for the terminal to select or reselect a cell is not satisfied, the terminal may perform an operation of measuring and determining a candidate sidelink relay to reselect a sidelink relay. Here, the terminal may not find a suitable sidelink relay, may not find a suitable cell, and when the terminal determines to able to camp on an acceptable cell to receive a limited service, the terminal may perform an operation required for transition to RRC_IDLE. |
| If the RRC_INACTIVE Remote UE fails to find a suitable Relay UE and |
| If the RRC_INACTIVE Remote UE fails to find a suitable cell and camps on the acceptable cell to obtain limited service as defined in TS 38.304, the UE shall: |
| 1> perform the actions upon going to RRC_IDLE as specified in 38.331 subclause 5.3.11 with release cause 'other' to indicate the release of the RRC connection to upper layers. |

An example of a terminal operation is as shown in [Table 12] below.

TABLE 12

| |
|---|
| For example, in case that a condition for the terminal to reselect a sidelink relay is satisfied and a condition for the terminal to select or reselect a cell is not satisfied, the terminal may perform an operation of measuring and determining a candidate sidelink relay to reselect a sidelink relay. Here, the terminal may not find a suitable sidelink relay, may not find a suitable cell, and when the terminal determines to able to camp on an acceptable cell to receive a limited service, the terminal may perform an operation required for transition to RRC_IDLE. |
| If the RRC_INACTIVE Remote UE fails to find a suitable Relay UE and |
| If the RRC_INACTIVE Remote UE fails to find a suitable cell and camps on the acceptable cell to obtain limited service as defined in TS 38.304, the UE shall: |
| 1> perform the actions upon going to RRC_IDLE as specified in 38.331 subclause 5.3.11 with release cause 'other' to indicate the release of the RRC connection to upper layers. |

(option 1)

NOTE:

It is left to UE implementation how to behave when T380-indirect/T380-Value B (remote UE was connected to Relay UE) or T380/T380-Value A (remote UE was connected to a cell directly) expires while the Remote UE is not connected to Relay UE and the Remote UE is camped neither on a suitable nor on an acceptable cell.

(option 2)

NOTE:

Remote UE may perform relay (re)selection and cell (re)selection when T380-indirect/T380-Value B (remote UE was connected to Relay UE) or T380/T380-Value A (remote UE was connected to a cell directly) expires while the Remote UE is not connected to Relay UE and the Remote UE is camped neither on a suitable nor on an acceptable cell. The selection of either a cell or a relay UE is up to Remote UE implementation.

In the RRC_INACTIVE state, the sidelink relay may be connected to an RRC_INACTIVE remote terminal or an RRC_IDLE remote terminal. The sidelink relay in the RRC_INACTIVE state may monitor paging of the RRC_INACTIVE remote terminal or the RRC_IDLE remote terminal to transmit a paging message to a destination remote terminal of the paging or an SIB message to a remote terminal, monitor paging of the sidelink relay in the RRC_INACTIVE state itself, and monitor an SIB message therefor. In case of being connected to at least one RRC_INACTIVE UE, the sidelink relay may not transition to the RRC_IDLE state.

When the sidelink relay may fail to find a suitable cell and is required to camp on an acceptable cell to receive a limited service, the sidelink relay may perform an operation of performing transition to RRC_IDLE. Here, if there is an RRC_INACTIVE terminal connected to the sidelink relay, the sidelink relay may transmit an indication through the PC5 interface so that the RRC_INACTIVE terminal may select another sidelink relay or cell. That is, when the sidelink relay enters a mode for receiving a limited service, an indication for releasing the connection with the RRC_INACTIVE terminal connected through the PC5 link may be transmitted to the RRC_INACTIVE terminal. When the RRC_INACTIVE terminal receives a PC5 indication indicating relay reselection/cell selection from the sidelink relay, the terminal may perform a procedure of selecting another sidelink relay or selecting a cell.

programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Furthermore, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Furthermore, a separate storage device on the communication network may access a portable electronic device.

---

If the Relay UE in RRC_INACTIVE state fails to find a suitable cell and camps on the acceptable cell to obtain limited service as defined in TS 38.304 [20], the Relay UE shall:

1> if all the PC5 connected Remote UE are in RRC_IDLE state, perform the actions upon going to RRC_IDLE as specified in 38.331 subclause 5.3.11 with release cause ‘other’ to indicate the release of the RRC connection to upper layers.

1> else if there is PC5 connected Remote UE in RRC_INACTIVE state, send an indication to the PC5 connected Remote UE in RRC_INACTIVE which may trigger relay reselection/cell selection and perform the actions upon going to RRC_IDLE as specified in 38.3331 subclause 5.3.11 with release cause ‘other’ to indicate the release of the RRC connection to upper layers.

---

NOTE:

It is left to UE implementation how to behave when T380 expires while the UE is camped neither on a suitable nor on an acceptable cell.

For another example, when the sidelink relay may fail to find a suitable cell and is required to camp on an acceptable cell to receive a limited service, the sidelink relay may perform an operation of performing transition to RRC_IDLE. Here, if there is an RRC_IDLE terminal and an RRC_INACTIVE terminal connected to the sidelink relay through the PC5 link, the sidelink relay may transmit an indication through the PC5 interface so that the RRC_IDLE terminal and the RRC_INACTIVE terminal may select another sidelink relay or cell. That is, when the sidelink relay enters a mode for receiving a limited service, the sidelink relay may not perform a role of relay terminal, so an indication for releasing the PC5 link with the connected RRC_INACTIVE terminal and RRC_IDLE terminal may be transmitted. When the RRC_INACTIVE terminal and the RRC_IDLE terminal receive a PC5 indication indicating relay reselection/cell selection from the sidelink relay, the terminal may perform a procedure of selecting another sidelink relay or selecting a cell.

Methods disclosed in the claims and/or methods according to the embodiments described in the specification of the disclosure may be implemented by hardware, software, or a combination of hardware and software.

When the methods are implemented by software, a computer-readable storage medium for storing one or more In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments set forth herein, but should be defined by the appended claims and equivalents thereof.

The invention claimed is:

1. A method performed by a remote terminal in a wireless communication system, the method comprising:

receiving, from a first base station, via a first relay terminal, a radio resource control (RRC) release message including information on a suspend configuration;

entering an RRC inactive state, based on the information on the suspend configuration;

selecting a second relay terminal based on a relay reselection procedure in the RRC inactive state;

identifying whether a radio access network notification area (RNA) update (RNAU) is triggered, based on the selection of the second relay terminal; and in case that the RNAU is triggered, performing an RNAU procedure.

2. The method of claim 1, wherein identifying whether the RNAU is triggered based on the selection of the second relay terminal comprises:

receiving, from a second base station, via the second relay terminal, system information including information associated with a serving cell;

identifying whether the serving cell belongs to an RNA configured for the remote terminal based on the system information; and in case that the serving cell does not belong to the RNA configured for the remote terminal, determining to initiate the RNAU procedure.

3. The method of claim 2, wherein the information on the suspend configuration includes RNA information, and wherein the RNA configured for the remote terminal is identified based on the RNA information.

4. The method of claim 2, wherein performing the RNAU procedure comprises transmitting, to the second base station, via the second relay terminal, an RRC resume request message including information on a cause set to RNAU.

5. The method of claim 1, wherein the RNAU procedure is performed further based on a periodic RNAU timer, in case that the information on the suspend configuration includes information on a first value for the periodic RNAU timer.

6. The method of claim 5, wherein the first value for the periodic RNAU timer is different from a second value for the periodic RNAU timer used by the second relay terminal.

7. A remote terminal in a wireless communication system, the remote terminal comprising:

a transceiver; and a controller configured to:

control the transceiver to receive, from a first base station, via a first relay terminal, a radio resource control (RRC) release message including information on a suspend configuration, enter an RRC inactive state, based on the information on the suspend configuration, select a second relay terminal based on a relay reselection procedure in the RRC inactive state, identify whether a radio access network notification area (RNA) update (RNAU) is triggered, based on the selection of the second relay terminal, and in case that the RNAU is triggered, perform an RNAU procedure.

8. The remote terminal of claim 7, wherein the controller is further configured to:

control the transceiver to receive, from a second base station, via the second relay terminal, system information based on the selection of the second relay terminal, the system information including information associated with a serving cell, identify whether the serving cell belongs to an RNA configured for the remote terminal based on the system information, and in case that the serving cell does not belong to the RNA configured for the remote terminal, determine to initiate the RNAU procedure.

9. The remote terminal of claim 8, wherein the information on the suspend configuration includes RNA information, and wherein the RNA configured for the remote terminal is identified based on the RNA information.

10. The remote terminal of claim 8, wherein the controller is further configured to control the transceiver to transmit, to the second base station, via the second relay terminal, an RRC resume request message including information on a cause set to RNAU.

11. The remote terminal of claim 7, wherein the RNAU procedure is performed further based on a periodic RNAU timer, in case that the information on the suspend configuration includes information on a first value for the periodic RNAU timer.

12. The remote terminal of claim 11, wherein the first value for the periodic RNAU timer is different from a second value for the periodic RNAU timer used by the second relay terminal.

* * * * *